April 28, 1959 F. E. MUNSCHAUER 2,884,108
FLUID OPERATED CLUTCH
Filed May 24, 1955 2 Sheets-Sheet 1
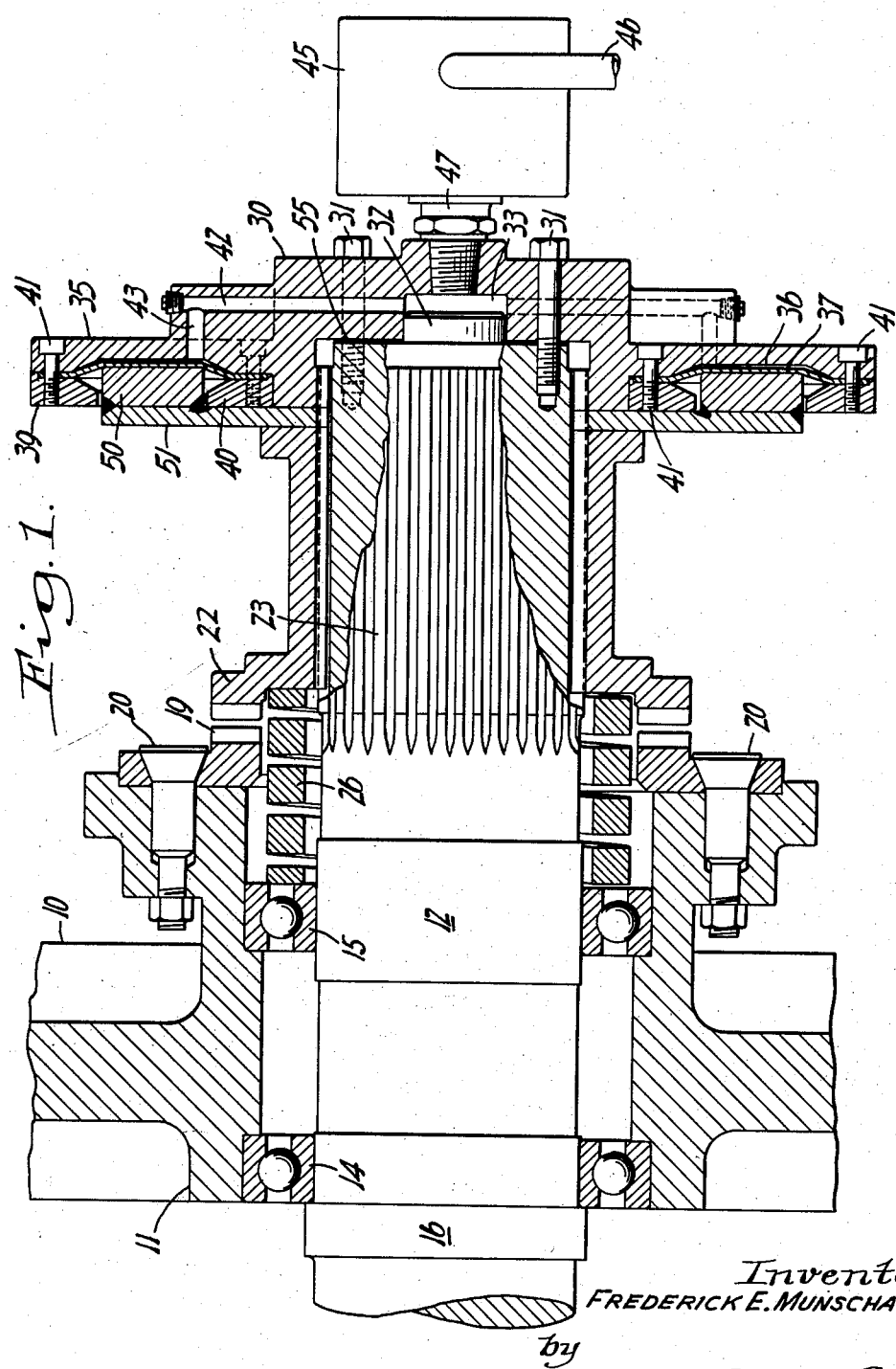
Inventor:
FREDERICK E. MUNSCHAUER
by
Bean, Brooke, Buckley & Bean.
Attorneys

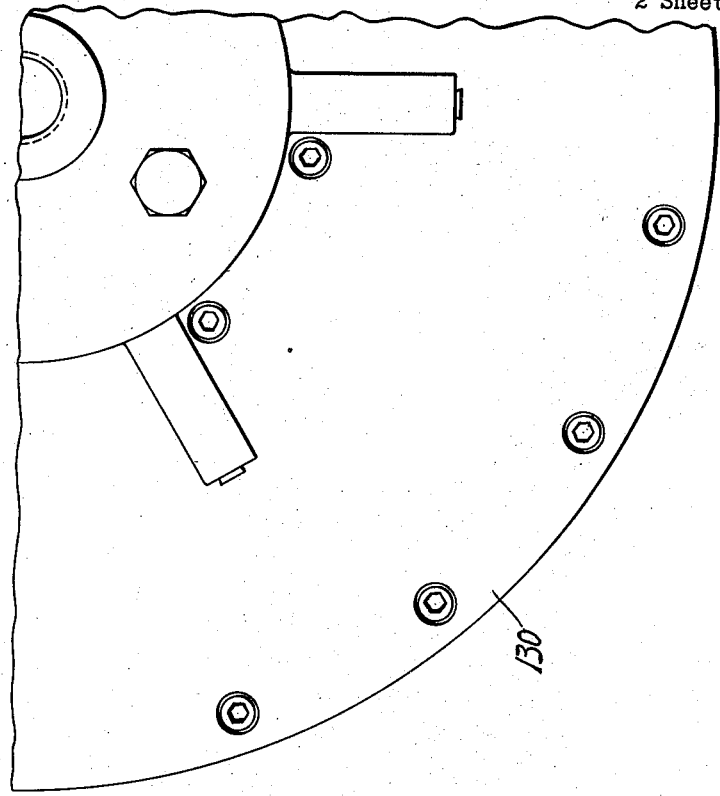
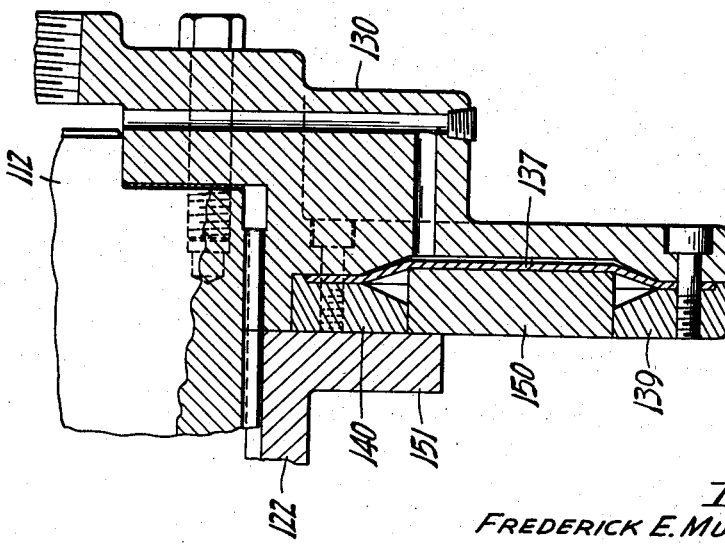

United States Patent Office
2,884,108
Patented Apr. 28, 1959

2,884,108

FLUID OPERATED CLUTCH

Frederick E. Munschauer, Buffalo, N.Y., assignor to Niagara Machine and Tool Works, Buffalo, N.Y.

Application May 24, 1955, Serial No. 510,652

4 Claims. (Cl. 192—88)

This invention relates to drive means for machinery and particularly to a novel clutch arrangement for connecting and disconnecting the driving and driven portions in power driven machines.

The principles of the present invention may be applied whenever the advantages thereof indicate, but the clutch arrangement of the present invention is particularly advantageous in the drive mechanisms of power presses, power shears, and the like, where relatively high work output subjects the clutch to very considerable loads. In machinery of this class positive drive means is highly desirable and, in its primary form, the present invention provides a positive jaw clutch drive means which may be readily and conveniently controlled by fluid pressure acting in opposition to spring means.

While general reference is made herein to fluid pressure operation, the usual source of fluid energy is compressed air. The present clutch mechanism is simpler in construction than those of the prior art and the arrangement is such that the action of the compressed air against the member which engages the clutch is direct and immediate and, therefore, makes for faster clutch engagement and, in fact, also quicker disengagement.

According to the present invention, all parts of the clutch mechanism, excepting the flywheel, are stationary excepting when the flywheel or other drive wheel and the drive shaft are clutched for joint rotation. Further, when the clutch is disengaged the reaction of the compression coil spring which urges the clutch to disengaged position is borne by parts that remain stationary with the drive shaft. Since the clutch is usually disengaged for the major part of the time when the flywheel is running, this is a material factor.

According to the construction of the present invention, the flywheel is mounted independently of all of the clutch parts, excepting of course the fixed jaw which is secured thereto, so that the clutch parts may be entirely removed without disturbing the flywheel, for servicing or for any other reason.

The arrangement of the clutch of the present invention is such that the overall length of the mechanism is greatly reduced which, besides the obvious saving in space, is particularly advantageous in reducing the degree of overhang of the clutch mechanism when it is mounted at the end of a drive shaft.

According to one form of the present invention, the fluid pressure which acts to engage the clutch elements is directed against an annular diaphragm which moves the axially slidable clutch component to engaged position through an annular flange element which has a radial face portion in abutment with the diaphragm and an oppositely facing radial portion in engagement with the adjacent end of the axially slidable clutch element.

An important advantage which results from the use of the principles of the present invention is the fact that the need for accurately machined and finished surfaces, as in piston and cylinder construction, is eliminated as to the pressure applying and transmitting portions of the mechanism.

Specific embodiments of the principles of the present invention are illustrated in the accompanying drawings and described in detail in the following specification. These embodiments are by way of example only and the present invention is not limited to those forms or otherwise excepting as defined in the appended claims.

In the drawing:

Fig. 1 is a longitudinal fragmentary central cross-sectional view through one form of the device of the present invention;

Fig. 2 is a view similar to Fig. 1 but on an enlarged scale and showing only a fragmentary right-hand portion of the drive shaft and illustrating a modified form of the means for transmitting the diaphragm pressure force to the axially movable clutch element; and Fig. 3 is a fragmentary end elevational view of the structures of either of Figs. 1 or 2.

Like characters of reference denote like parts and, referring to the form of the present invention illustrated in Fig. 1, the numeral 10 designates a flywheel, gear or other driving wheel element having a hub 11. The numeral 12 designates one end portion of a drive shaft which may comprise the crankshaft of a power press or similar machine wherein the shaft is to be intermittently or selectively rotated by connection with the flywheel or other driving wheel 10. While shaft 12 may comprise the crankshaft or eccentric shaft of a punch press, power shear, or like machine, it may be an intermediate shaft having further driving connection with the ultimate driven shaft of the machine.

A pair of anti-friction bearings 14 and 15 support flywheel 10, the inner race of bearing 14 being in abutment with an enlargement 16 of shaft 12. A jaw clutch element 19 is fixed to flywheel 10 and, in the illustrated instance, the flywheel is recessed to receive the clutch element, the latter being secured by means of bolts 20. A movable clutch element 22 of sleeve form has spline connection with shaft 12 as at 23, whereby it is fixed against rotation relative to shaft 12 but is axially slidable thereon.

A compression coil spring 26 is disposed about shaft 12 between anti-friction bearing 15 and movable clutch element 22 and urges the latter to a normally disengaged position as illustrated in Fig. 1. The left-hand end of spring 26 seats against the inner race of bearing 15.

In the form of the present invention illustrated herein, an adaptor 30 which supports the entire fluid pressure clutch engaging mechanism is secured to the end of shaft 12 by means of screws 31, the shaft 12 having a reduced end portion 32 engaging in a complementary recess 33 in adaptor 30 to accurately locate the same.

The adaptor 30 includes a radial flange 35 which is provided at its left-hand face, as viewed in Fig. 1, with an annular recess 36 which receives a flexible annular diaphragm 37. The diaphragm 37 may be a neoprene nylon combination for maximum durability and lasting flexibility or may be of such other material or materials as afford the desired physical characteristics. Diaphragm 37 is held against the left-hand face of flange 35 by outer and inner annular retaining or clamping rings designated 39 and 40, respectively. Screws 41 pass through flange 35 and diaphragm 37 and thread into rings 39 and 40.

The recess 36 of flange 35 cooperates with the diaphragm 37 to form a fluid pressure chamber, and fluid pressure communication thereto is established by a series of radial passages 42 which emanate from the central recess 33 of adaptor 30 and terminate outwardly in axially extending passages 43 leading to recess 36. Adaptor 30 is provided centrally at its outer face with a rotary fluid pressure connector 45. The body of connector 45 remains stationary and is connected with a relatively stationary pressure supply pipe 46, while an outlet stem portion 47 is screwed into adaptor 30 and is freely rotatable relative to the body 45 of the connector. The interior details of the connector need not be illustrated or described since these devices are freely available commercially.

In Fig. 1 the numeral 50 designates an annular pressure plate which lies loosely between the outer and inner diaphragm retaining rings 39 and 40 and has welded or otherwise rigidly attached thereto a second annular plate 51 which extends radially inwardly to shaft 12 and is splined to fit the splines 23 of the shaft. The adjacent portion of adaptor 30 is preferably likewise internally splined as shown in Fig. 1.

It will be noted that an inner portion of plate 51 abuts the adjacent end flange of slidable clutch element 22, and it is believed obvious that application of air pressure to diaphragm 37 in recess 36 will engage clutch element 22 with clutch element 19 against the resistance of spring 26.

It will be noted that the recess 33 in adaptor 30 forms part of the fluid pressure line and, accordingly, an annular gasket is interposed between the end of shaft 12 and the engaging face of adaptor 30 as at 55 in Fig. 1.

Since plate member 51 and adaptor 30 are both splined to shaft 12 along with the slidable clutch element 22, all of these parts are either stationary or rotating in unison, so that there is no intersliding and no frictional wear on the several parts as a result of such intersliding. That is of particular importance as regards the diaphragm 37 which, by its nature, is more susceptible to frictional wear and damage than the other parts of the mechanism.

Fig. 2 shows a modification wherein a mere variation in the respective diameters of certain of the parts permits the diaphragm pressure ring to act directly against the end flange of the sliding clutch element. Fig. 3 will be referred to as a fragmentary end view of the structure of Fig. 2, but it illustrates equally well the right-hand end of the embodiment illustrated in Fig. 1.

As in the embodiment of Fig. 1, the embodiment of Figs. 2 and 3 comprises a crank shaft 112 which has fixed to its end an adaptor 130 which includes a diaphragm 137 secured thereto by outer and inner clamping rings 139 and 140. A diaphragm pressure ring is designated 150 and an inner portion thereof engages directly against an end flange 151 of an axially slidable clutch element 122.

All of the other details of construction of this embodiment are identical with that of Fig. 1, including the means of fluid pressure communication to the diaphragm 137, and, accordingly, no further description of these details is believed to be necessary.

What is claimed is:

1. Drive means for power presses, shears and like machines comprising a shaft to be driven intermittently, a normally rotating drive wheel on said shaft, an annular jaw clutch element fixed to a face of said drive wheel, an axially slidable complementary jaw clutch element keyed to said shaft and facing the first-mentioned jaw clutch element, a compression coil spring acting against the slidable jaw clutch element to urge the same to disengaged position, and fluid pressure means for engaging the slidable jaw clutch element against the resistance of said spring, said fluid pressure means including a member fixed to said shaft spaced axially from the first-mentioned jaw clutch element with the slidable jaw clutch element disposed between the fixed jaw clutch element and said member, said member including a radially extending flange having a generally radial surface facing said first-mentioned jaw clutch element and disposed radially outwardly thereof, an annular flexible diaphragm and inner and outer clamping rings securing the same to said facing surface at the inner and outer peripheral margins of said diaphragm, an annular pressure ring having an outer radial portion in abutment with the exposed face of said diaphragm and an inner radial portion in abutment with the adjacent end of the slidable jaw clutch element, and fluid pressure supply passage means in said member and said radially extending flange and emerging from said radial surface between the outer and inner margins of said diaphragm to act against the diaphragm.

2. Drive means for power presses, shears and like machines comprising a shaft to be driven intermittently, a normally rotating drive wheel on said shaft, an annular jaw clutch element fixed to a face of said drive wheel, an axially slidable complementary jaw clutch element keyed to said shaft and facing the first-mentioned jaw clutch element, a compression coil spring acting against the slidable jaw clutch element to urge the same to disengaged position, and fluid pressure means for engaging the slidable jaw clutch element against the resistance of said spring, said fluid pressure means including a member fixed to said shaft spaced axially from the first-mentioned jaw clutch element with the slidable jaw clutch element disposed between the fixed jaw clutch element and said member, said member including a radially extending flange having a generally radial surface facing said first-mentioned jaw clutch element and disposed radially outwardly thereof, an annular flexible diaphragm secured to said facing surface at its inner and outer peripheral margins, an annular pressure ring having an outer radial portion in abutment with the exposed face of said diaphragm and an inner radial portion in abutment with the adjacent end of the slidable jaw clutch element, and fluid pressure supply passage means in said member and said radially extending flange and emerging from said radial surface between the outer and inner margins of said diaphragm to act against the diaphragm.

3. Drive means for power presses, shears and like machines comprising a shaft to be driven intermittently, a normally rotating drive wheel on said shaft, an annular jaw clutch element fixed to a face of said drive wheel, an axially slidable complementary jaw clutch element keyed to said shaft and facing the first-mentioned jaw clutch element, a compression coil spring having one end fixed axially relative to said shaft and the other end acting against the slidable jaw clutch element to urge the same to disengaged position, and fluid pressure means for engaging the slidable jaw clutch element against the resistance of said spring, said fluid pressure means including a member fixed to said shaft at the end of the slidable clutch element lying opposite the fixed jaw clutch element and including a radially extending flange having a generally radial surface facing said first-mentioned jaw clutch element and disposed radially outwardly thereof, an annular flexible diaphragm secured to said facing surface at its inner and outer peripheral margins, an annular pressure ring having its opposite faces in abutment with said diaphragm and with the adjacent end of the slidable jaw clutch element with an outer radial portion of one face in abutment with said diaphragm and an inner radial portion of the opposite face in abutment with the slidable jaw clutch element, and fluid pressure passage means in said member and said radially extending flange and emerging from said radial surface between the outer and inner margins of said diaphragm.

4. Drive means for power presses, shears and like machines comprising a shaft to be driven intermittently, a normally rotating drive wheel on said shaft, an annular jaw clutch element fixed to a face of said drive wheel toward one end of said shaft, an axially slidable complementary jaw clutch element keyed to said shaft and facing the first-mentioned jaw clutch element, a compression coil spring having one end fixed axially relative to said shaft and the other end acting against the slidable jaw clutch element to urge the same to disengaged position, and fluid pressure means for engaging the slidable jaw clutch element against the resistance of said spring, said fluid pressure means including a member fixed to said end of said shaft and including a radially extending flange having a generally radial surface facing said first-mentioned jaw clutch element and disposed radially outwardly thereof, an annular flexible diaphragm secured to said facing surface at its inner and outer peripheral margins, an annular pressure ring having its opposite faces in abutment with said diaphragm and with the adjacent end of the slidable jaw clutch element with an outer radial portion of one face in abutment with said diaphragm and an inner radial portion of the opposite face in abutment with the slidable jaw clutch element, and fluid pressure passage means in said member and said radially extending flange and emerging from said radial surface between the outer and inner margins of said diaphragm.

References Cited in the file of this patent

UNITED STATES PATENTS

| | | |
|---|---|---|
| 1,879,633 | Olsen | Sept. 27, 1932 |
| 2,074,738 | Aikman | Mar. 23, 1937 |
| 2,090,401 | Mayo | Aug. 17, 1937 |
| 2,467,830 | Hornbostel | Apr. 19, 1949 |
| 2,584,191 | Danly | Feb. 5, 1952 |
| 2,588,724 | Hobbs et al. | Mar. 11, 1952 |
| 2,605,749 | Buckendale | Aug. 5, 1952 |
| 2,620,054 | Munschauer | Dec. 2, 1952 |
| 2,785,781 | Johansen | Mar. 19, 1957 |

FOREIGN PATENTS

| | | |
|---|---|---|
| 18,344 | Great Britain | Oct. 15, 1900 |